Dec. 13, 1966 C. L. JAMES ETAL 3,290,987

AUTOMATIC SEARCHING FILM READER

Filed Jan. 16, 1964

CLAIRE L. JAMES
RAYMOND L. NELSON
INVENTORS

BY R. Frank Smith
David P. Ogden

ATTORNEYS 3,290,987

AUTOMATIC SEARCHING FILM READER

Claire L. James and Raymond L. Nelson, Rochester, N.Y., assignors to Eastman Kodak Company, Rochester, N.Y., a corporation of New Jersey Filed Jan. 16, 1964, Ser. No. 338,140
6 Claims. (Cl. 88—24)

The present invention relates to an automatic film searching and printing arrangement for viewing, sorting, selecting and retrieving information placed on a film and automatically reproducing enlarged copies of information stored in a reduced size upon the film being searched.

One efficient type of information storage and retrieval system that is currently being used extensively is often referred to as microfilm storage. Using this type of information storage, copies of documents and data are recorded on film such as 16 mm. film with the size of the recording on the film being of the order of 1 mm. per inch of page of the document. Obviously such reduction of size allows a substantial reduction in document storage volume and simplifies mass handling of documents. However, such a reduction in size inhibits direct reading of the documents thus stored and the usual procedure for reading them is to project them on a screen whereby they are amplified to a size corresponding to the original size of the document.

Since literally thousands of documents are stored on each reel of film, hand searching of these documents can be extremely time-consuming with the result that documents might be effectively lost if such searching were requisite. Therefore, automatic searching techniques have been developed usually by various film encoding techniques whereby a document accompanies a number on an adjacent piece of the film and a search machine is able to detect this number. These numbers may be optically encoded by use of digital information handling techniques or may be magnetically encoded. Modern electronic circuits coupled to detectors are able to detect and interpret various codes with a minimum of inspection time whereby films containing desired documents may be passed through the searching equipment at relatively high velocities such as 100 or 200 feet per minute. Such velocities allow the searching of several reels of recorded information in a relatively short time.

However, these velocities result in mechanical problems in stopping the film at the particular document to be studied. Various relatively complex arrangements for disengaging the drive means and stopping the film have been presented by prior art devices. Each of these devices suffers from either complexity of equipments or a serious problem of inaccuracy in that the film is not stopped at the precise document desired. One of the reasons for this is the general method of approach to stopping the document at the precise viewing location.

Therefore, an object of the present invention is to provide a relatively simple automatic searching reader-printer arrangement having an improved operating cycle.

In accordance with one embodiment of our invention a film reader is provided with a keyboard control having a plurality of switch means to encode various circuits and control equipments thereof so that a specific document, which may be on a particular roll of film, may be found and stopped at the viewing station. The stopping operation includes detecting the requested encoding indicative of a particular document, counting the distance the film moves past that document and thereafter returning the film at lower velocity to the document next to the "hit." The keyboard control also includes means for energizing copying equipment to provide full-size copies of a particular document or series of documents of one encoding or several documents of different encodings. The result is that the arrangement will search a reel of film quickly. If a document or series of documents of a particular coding are on that film, a printer may be energized to print one or several copies of the first document in each of the series selected or of all the documents in any series or all of the documents in several series. If no encoding of the type or types requested at the keyboard is on the film being searched, the keyboard may be switched to automatically cause rewind of the film so that the next film may be inserted for searching. The forward driving velocity of the film is such that a roll having no desired information recorded thereon may be searched in the order of a minute. Similarly, a copy of a desired document will be reproduced on the order of five minutes after the film is initially started in the machine.

The subject matter which is regarded as our invention is particularly pointed out and distinctly claimed in the concluding portion of this specification. The invention, however, as to its organization and operation together with further objects and advantages thereof, will best be understood by reference to the following description taken in connection with the accompanying drawing in which:

Figure 1:
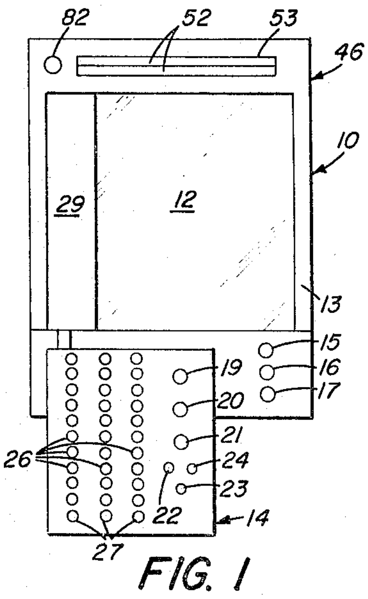
FIG. 1 is a simplified front elevation view illustrating one embodiment of our invention.

Referring now to the drawing wherein like numbers indicate similar parts, we have shown in FIG. 1 an automatic searching and printing film reader 10 according to the present invention. The front of the film reader 10 comprises a viewing screen 12 mounted on a cabinet 13 to which is attached a keyboard control 14. We have also provided overriding manual controls including a power-on switch 15, a forward search and rewind switch selector 16 and a one-frame advance and a one-frame rewind selector 17. The keyboard 14 contains an automatic rewind on-off switch 19, a positive or negative film selection switch 20, an automatic print selector switch 21, a search-stop switch 22, a search switch 23, and a rewind switch 24.

A primarily important element of the keyboard 14 is a column encoding mechanism including a plurality of numerical keys 26 and a series of off buttons 27. This keyboard is decimally encodable to select a particular document or series of documents on the film being searched. The keyboard illustrated shows a single encoding element usable with, for instance, the first column of an encoding system. If two or three columns are to be used for detecting a particular document, additional keyboard encoding switches are used. However, these substantially duplicate the function of that shown and need not be separately discussed herein. The keyboard 14 is functionally connected to a bank of photocells 29 positioned to receive light from the optical system of the film reader 10.

Figures 2, 4:
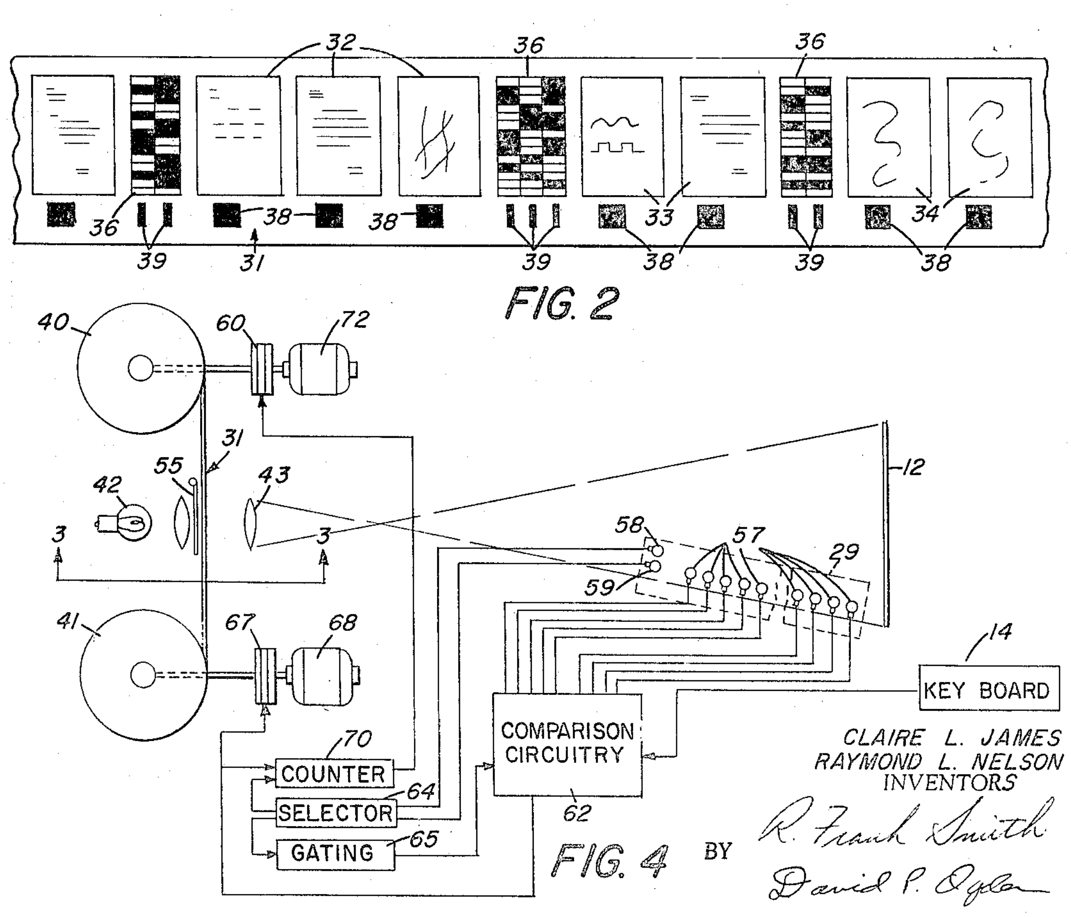
FIG. 2 illustrates a typical film to be searched by the embodiment shown in FIG. 1.
FIG. 4 is a schematic diagram illustrating various operational relationships.

In order to more clearly understand the operation of the present invention we have shown in FIG. 2 a typical section of a film 31 having a plurality of documents 32, 33, and 34. The documents may contain several pages such as three indicated at 32 or two indicated at 33 or more. The encoding of the various dockets is provided in columnar form as indicated at 36 with two or three columns of digitally encoded information being illustrated in the portion of the strip shown. Obviously, more or fewer columns may be used as necessary. Moreover, the encoding that might be pertinent to a particular search may appear on any one of these columns according to the prearranged system for recording the information in accordance with the code number of the document or subject matter thereof. Each page of a document is also provided with a document position mark as at 38 and each column of code is provided with a code position mark as indicated at 39. It will become readily apparent that the photocells in the photocell bank 29 may be arranged to selectively detect various bits of information in accordance with the light transmission of the film.

Figure 3:
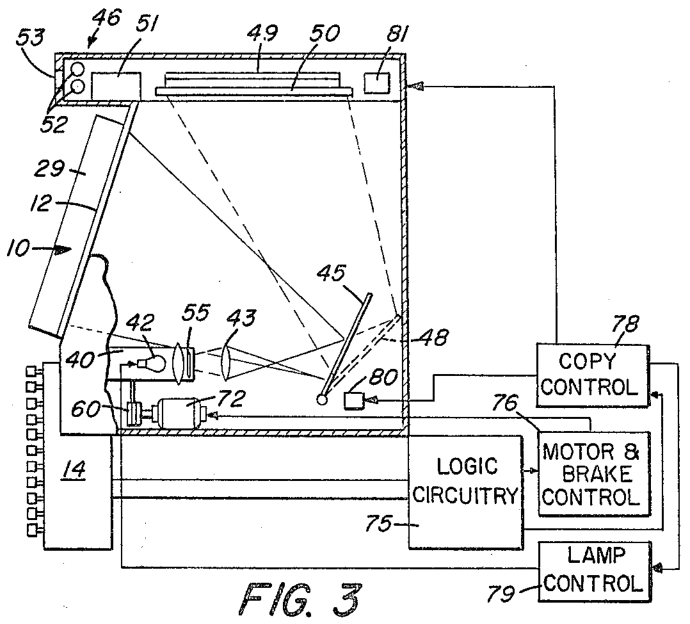
FIG. 3 is a side plan view partially in section of the embodiment illustrated in FIG. 1.

Referring now to FIGS. 3 and 4, the filmstrip 31 is contained on a reel 40 and is wound during searching on a reel 41. A projection lamp 42 is positioned between the reels 40 and 41 to illuminate a central portion or length thereof through a lens system 43. The image developed by the lamp 42 and the lens system 43 impinges upon a mirror 45 and from there is reflected to the screen 12 and the photocell detector bank 29. At such time as a copy is called for by the selector switch 21, a photocopier 46 is energized and the mirror 45 is tilted backwards to the position shown in dashed lines at 48.

The photocopier 46 illustrated in FIG. 3 may be a relatively conventional mechanism having a sensitized paper supply 49, a shutter plate 50, a developing fluid tank 51 and transport means such as rollers 52. As shown more clearly in FIG. 1, the output transport rollers 52 are aligned with a slot 53 so that the finished print is presented in the region of the operator.

Because of the fact that the film 31 may be damaged by the heat of the lamp 42, we have provided a heat filter screen 55 (FIG. 4) between the lamp 42 and the film 31. However, since various photocell and photosensitive elements, one portion indicated at 57 and another portion indicated at 58 and 59, are most sensitive to infrared light, the filter 55 is retracted when photoelectric code detection is employed during the search operation. At such time as the film 31 is stopped for reading or reprinting purposes, the filter 55 is inserted further to more fully protect the film 31. A simple means of controlling the position of filter 55 is to functionally link it to a clutch 60 of the drive means of the reels 40 or 41.

Normally the drive means will be energized in accordance with the setting of the search switch 23 or the rewind switch 24. If energized by the search switch 23, the search operation will be terminated in accordance with selected energization of the photosensitive elements of the portion 57 which are coupled to a comparison circuitry 62. In order to properly gate the comparison circuitry, the signal selector photosensitive elements 58 and 59 are spaced longitudinally of the film so that both may simultaneously detect the document marks 38, but they sequentially detect code marks 39. Assuming that the film 31 is running in a search direction such that the photocell 58 first encounters document marks and code marks and the photocell 59 next encounters these marks, at such times as the photocell 58 is encountering such a mark when the photocell 59 encounters that same mark this mark must be a document mark 38 of substantially greater length than the code marks 39. On the other hand, if the photocell 58 first encounters a mark, the photocell 59 encounters that mark after the photocell 58 has lost the mark signal, the mark is a code mark 39 and a selector circuit 64 then energizes a gating circuit 65 to turn on the comparison circuitry 62.

At such time as the comparison circuitry 62 detects encoding 36 of the type called for by the setting of the keyboard keys 26, a "hit" is made. The hit signal immediately causes de-energization of a drive clutch 67 of a high speed motor 68 and energizes a braking means (not shown). A similar signal is provided to turn on a counter circuit 70 so that document marks 38 from the photocells 58 and 59 will be applied to the counter circuit 70 when both of these photocells are energized, thus counting the document images that pass by the photocell bank 29 after a signal to stop the film has been generated. A simple arrangement for such counting is to linearly charge a capacitor as each document mark is detected, and during rewind to the desired document to similarly discharge this capacitor.

Preferably slow rewind is accomplished by a second motor 72 which is coupled through the clutch 60 to slowly rewind at velocities such as 10 f.p.m. the film until each of the document marks counted by the circuit 70 has been recounted. Then the film 31 is stopped so that the particular document called for by the switching of the numerical keys 26 is presented on the viewing screen 12.

Referring again to FIG. 3, the keyboard 14 is coupled to logic circuitry indicated generally at 75. This logic circuitry includes the comparison circuitry 62, selector circuit 64, gating circuit 65 and the counter circuit 70 plus many other gating circuits, parity check circuits and the like necessary to provide selective control and searching as discussed above. The logic circuitry 75 has a primary control function of detecting a particular document code as discussed above generally in connection with FIG. 4, of generating signals to initiate motor and brake control as indicated at 76 so that both the driving of the reels is terminated and their continued motion is inhibited when a code column is indicated. The logic circuity 75 is also responsive to the setting of the automatic print selector switch 21 and if called for will initiate operation of the copy control circuit 78. The copy control circuit 78 is in itself a relatively simple logic circuit which first extinguishes the lamp 42 by means of a lamp control circuit 79, next tilts the mirror 45 to the position 48 indicated in dashed lines by means of a solenoid 80 and initiates operation of a photocopier 46. When the paper to be exposed is properly positioned for exposure, the lamp control circuit 79 regulates the illumination of the lamp 42 in conjunction with the shutter 50 to prevent blurring after which a logic circuit 81 within the photocopier itself regulates developing of the exposed print.

The above-mentioned circuits are all of conventional types. For instance, the selector circuit 64 may be most easily envisioned as an "and" gate coupled to provide a signal to the counter 70 only when both photocells 58 and 59 are not receptive of light flux during the passage of a document mark 38, with the signal of the photocell 58 also passing to an inhibit circuit to prevent flow of the trigger pulse from the leading edge of the signal of the photocell 59 passing to the gating circuit 65. A small capacitor will selectively present the leading edge to such an inhibit circuit. Although more sophisticated arrangements are known, the copy control 78 is most easily envisioned as a timer arranged to sequentially operate the several items dependent thereon and receptive of a light intensity control signal from photocells (not shown) to regulate the duration of the operation of the lamp control 79 which functions as a power relay. The logic circuit 81 simply times the development of the print depending upon the paper (49) and solution (51) used at a particular time and may, like the copy control 78, be an adjustable clock motor. Because detailed explanations of these several circuits would unduly complicate this disclosure, and might tend to obscure the essence of our invention, they are not presented herein.

While we have shown and described particular embodiments of the present invention, other modifications may occur to those skilled in this art. For instance, an "out of paper" indicator lamp 82 may be mounted on the front of the photocopier 46. Also, various portions of the logic circuitry may be placed on printed circuit boards to be replaced as necessary for various changes of programming. We intend, therefore, to have the appended claims cover all modifications which fall within the true spirit and scope of our invention.

We claim:

1. An automatic searching film reader for use with a film bearing document images, distinctive optical coding between adjacent series of images and a position mark associated with each image, the reader comprising:

means for driving a film at a relatively high velocity during a searching operation;

means for illuminating the coding and position marks on the driven film;

first photocell means receptive of light flux from the illuminated coding for generating signals in response thereto;

comparison circuitry receptive of the signals from said first photocell means;

means for encoding said comparison circuitry to be selectively responsive to the signals generated in response to a preselected coding on the film and to develop a hit signal when such preselected coding is detected;

control means responsive to a hit signal for de-energizing said driving means;

other photocell means receptive of light flux from the illuminated position marks for detecting the position marks as the film overruns the position of the hit signal;

means for counting the position marks detected; and means for driving the film at a relatively low velocity in a reverse direction until the position marks are recounted.

2. An automatic searching film reader as in claim 1 wherein said encoding means conditions said comparison circuitry to develop a hit signal in response to coding generic to several preselected codings.

3. An automatic searching film reader as in claim 1 for use with a film having a code position mark associated with each distinctive coding and disposed in a region laterally on the film corresponding to the area of the document image position mark, the reader further comprising:

means for illuminating the code position marks; and means for activating said first photocell means to generate said signals only with the detection of said code position marks by said other photocell means .

4. An automatic searching film reader as in claim 1 having:

interlocking means associated with said comparison circuitry for preventing response thereof to said first photocell means during periods when an image position mark is being detected by said other photocell means.

5. An automatic searching film reader as in claim 1 having:

a viewing screen;

a station for receiving a photosensitive print material; and a movable light directing means for selectively projecting a document image toward said viewing screen or toward said station.

6. An automatic searching film reader as in claim 1 having:

means for regulating said illuminating means to provide intense illumination of said first and said other photocell means during the searching operation and reduced illumination of the film when it is stopped.

References Cited by the Examiner

UNITED STATES PATENTS

| | | | |
|---|---|---|---|
| 2,121,061 | 6/1938 | Townsend | 40—53 |
| 2,172,330 | 9/1939 | Bryce | 88—24 |
| 2,594,358 | 4/1952 | Shaw | 88—24 |
| 3,045,529 | 7/1962 | Kuehnle | 88—24 X |
| 3,094,034 | 6/1963 | Eagle et al. | 88—24 |
| 3,179,001 | 4/1965 | Silverman | 88—1 X |
| 3,240,119 | 3/1966 | Tyler | 88—24 X |

NORTON ANSHER, *Primary Examiner.*

H. H. FLANDERS, *Assistant Examiner.*